No. 790,485. PATENTED MAY 23, 1905.
L. H. DUNKER.
ROTOR CONSTRUCTION.
APPLICATION FILED SEPT. 19, 1904.
2 SHEETS—SHEET 1.
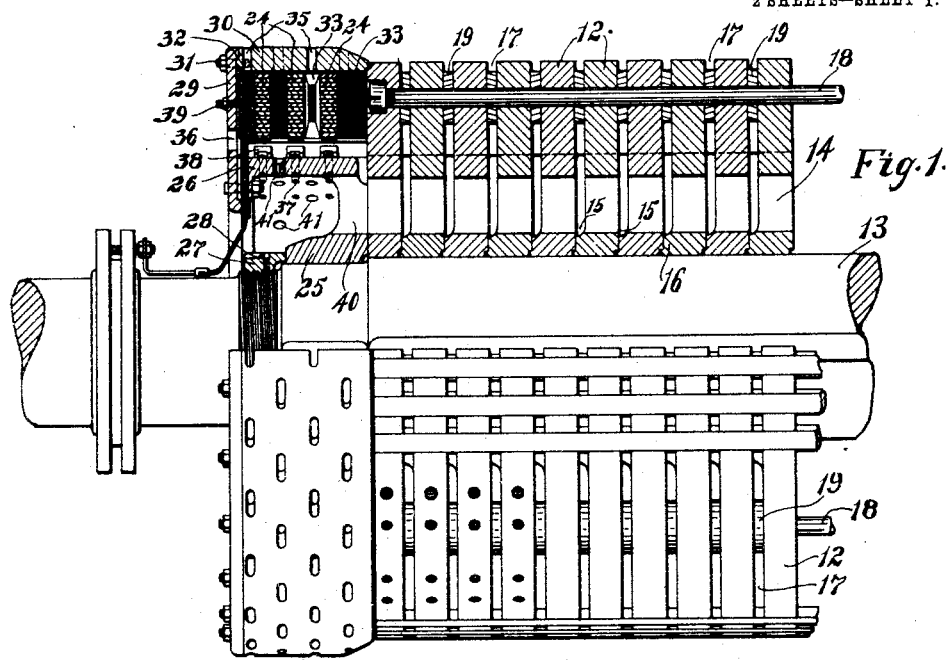
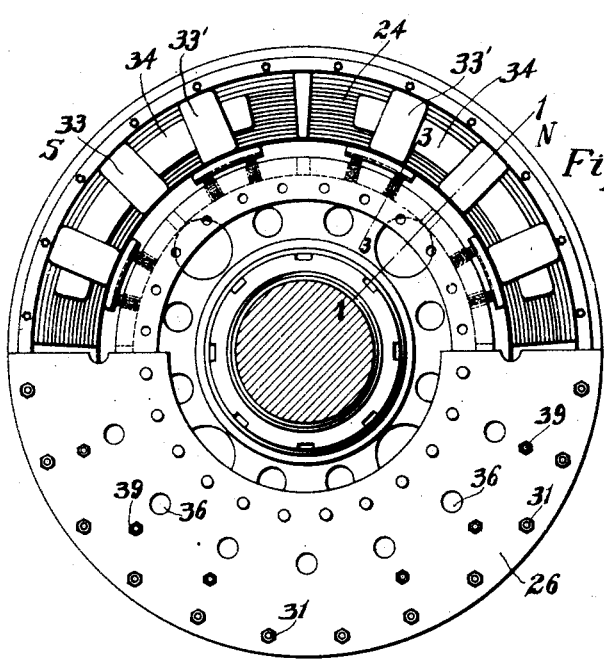
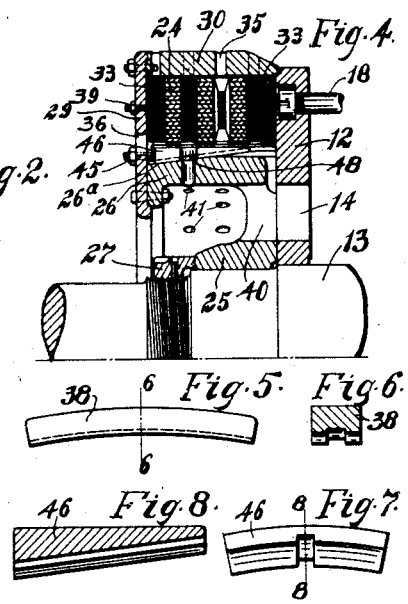
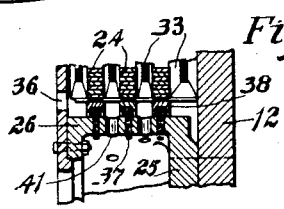
Witnesses:
George J. Schwartz
Fred J. Kinsey
Inventor:
Louis H. Dunker.
By
Chas. E. Lord
Attorney.

No. 790,485. PATENTED MAY 23, 1905.
L. H. DUNKER.
ROTOR CONSTRUCTION.
APPLICATION FILED SEPT. 19, 1904.

2 SHEETS—SHEET 2.

Witnesses:
George J. Schwartz.
Fred J. Kinsey.

Inventor:
Louis H. Dunker.
By
Chas. E. Lord
Attorney.

No. 790,485.	Patented May 23, 1905.

UNITED STATES PATENT OFFICE.

LOUIS H. DUNKER, OF NORWOOD, OHIO, ASSIGNOR TO THE BULLOCK ELECTRIC MANUFACTURING COMPANY, A CORPORATION OF OHIO.

ROTOR CONSTRUCTION.

SPECIFICATION forming part of Letters Patent No. 790,485, dated May 23, 1905.

Application filed September 19, 1904. Serial No. 225,068.

*To all whom it may concern:*

Be it known that I, LOUIS H. DUNKER, a citizen of the United States, residing at Norwood, in the county of Hamilton and State of Ohio, have invented certain new and useful Improvements in Rotor Construction, of which the following is a full, clear, and exact specification.

My invention relates to dynamo-electric machines, and more particularly to the construction and arrangement of the rotor or rotatable member of rotating field-alternators.

The object of my invention is an improved construction of rotating elements of high-speed dynamo-electric machines, such as turbo-alternators, providing a well-balanced structure with the core and windings rigidly held in place and properly ventilated.

The invention comprises improvements in the construction and arrangement of the rotatable member and specifically in the means employed for supporting the end turns or connections of the windings on said rotatable member, which will be hereinafter described, and more specifically pointed out in the appended claims.

Figure 9:
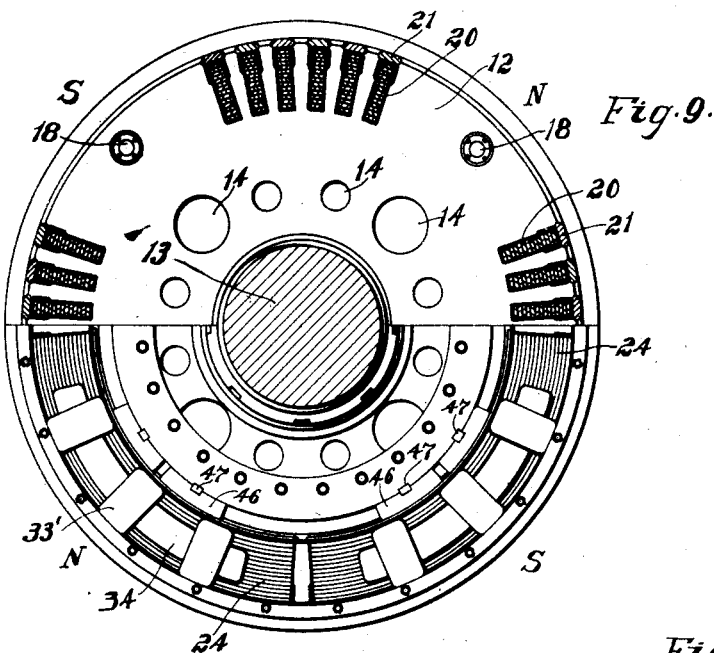
Figures 10, 11:
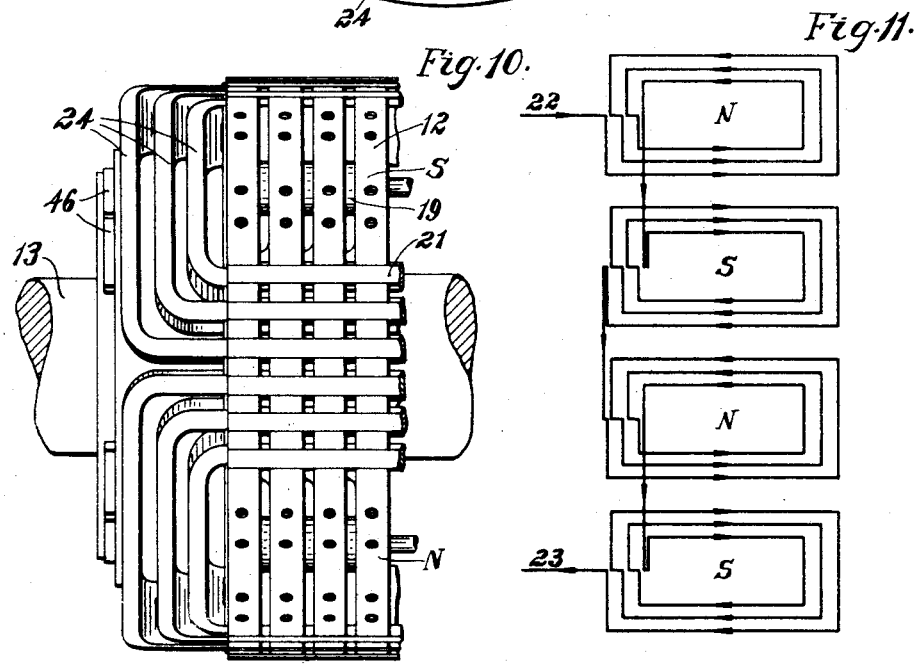

In the accompanying drawings, which illustrate the preferred embodiments of my invention, Figure 1 is a part side view and part vertical section of one end of a rotating field-magnet, the upper end of said figure being a section on the line 1 1 of Fig. 2. Fig. 2 is an end view of the field-magnet shown in Fig. 1, the lower half with the end cover in place and the upper half with said end cover removed. Fig. 3 is a section on the line 3 3, Fig. 2. Fig. 4 is a vertical section of a modified form of support for the end turns or connections of the windings. Fig. 5 is a side view of the supporting-segments used in the form illustrated in Figs. 1, 2, and 3. Fig. 6 is a section on 6 6, Fig. 5. Fig. 7 is an end view of one of the supporting-wedges used in the modification shown in Fig. 4. Fig. 8 is a section on 8 8 of Fig. 7. Fig. 9 is a composite end view and section of a rotor embodying the modified form of end-connection support. Fig. 10 is a plan view of one end of the rotor shown in Fig. 9 with the cylindrical end cover removed. Fig. 11 is a diagram of the connections of the rotor-windings.

Referring now to the drawings, the core of the rotatable member is made up of laminæ or steel plates 12, strung on the shaft 13. The shape of these laminæ is clearly shown in the upper half of Fig. 9, said core being of the slotted type. The laminæ are provided with registering openings 14, which comprise longitudinal ventilating passage-ways through the rotatable member. The laminæ are cut away at 15, so as to leave a projecting hub 16 on each lamina and spaces 17 between adjacent laminæ for the purpose of ventilation, these spaces communicating with the longitudinal passage-ways 14. The laminæ of the core are clamped together by tie-rods 18, upon which are strung spacing-blocks 19.

I have preferred to illustrate my invention as embodied in a four-pole rotor or rotating field-magnet with the windings held in position in slots 20 by means of the wedges 21, preferably made of phosphor-bronze or other non-magnetic material of great strength. The windings comprise a plurality of substantially concentrically-arranged coils surrounding each pole, said coils being preferably connected in series, as indicated in the diagram Fig. 11, to produce north poles at N and south poles at S, the current entering these coils through the leads 22 and 23 and flowing therethrough in the direction indicated by the arrows.

The end connections of the windings or coils on the poles of the rotatable member are indicated at 24, and the means employed for supporting said end turns or connections so as to allow the same to be independently adjustable and to hold said coils rigidly and firmly in position against the enormous centrifugal forces exerted thereon when the rotatable member is rotating at high speed will now be described. Referring to Figs. 1, 2, and 3, illustrating the preferred form, it will be seen that the collar 25, having the annular extending flange 26, is mounted upon the shaft 13, being held in place on said shaft against the core by means of the nut 27, carrying the set-screw 28 for holding the latter in position when once adjusted. Bolted to the end of said flange 26 is an annular end cover 29, and supported on said annular end cover and on the outer lamina of the core is an outside cylindrical cover 30. The annular end cover 29 and the outside cylindrical cover 30 are preferably bolted together at 31 and are provided with interlocking flanges at 32, which keep the cylindrical cover from moving out of balance when subjected to centrifugal forces. The end turns or connections 24 are maintained in a predetermined position at a definite distance apart by means of the separating or spacing blocks 33, preferably made of blocks of insulating material 33′, mounted upon the curved strip 34, having a predetermined radius of curvature to correspond to the curvature of the end turns. These separators or spacing-blocks are more clearly shown in Figs. 2 and 9 and are so constructed as to permit free circulation of air between the end connections for the purpose of ventilation. The outside cylindrical cover is provided with ventilating-openings 35, which register with the spaces between the end connections, and the annular end cover is also provided with a number of openings 36, which communicate with said spaces between the end connections. The collar 25 is provided with ventilating-openings 40, which communicate with the longitudinal passageways 14 through the core of the rotatable member. The flange 26 is also provided with radial openings 41, which communicate with the spaces between the end connections for the purpose of ventilation.

The end connections are clamped in position against radial displacement by being forced outwardly against the cylindrical cover 30 by means of the separately-adjustable screws 37, mounted in the projection flange 26 and bearing against segmental pieces 38, which rest against the inner surfaces of the end connections 24. This construction permits the end connections of the several coils on each core to be independently adjustable—that is, independently forced against the outside cylindrical cover to take up any discrepancies in the thickness of said end connections. (See Fig. 3.) Independently-adjustable screws 39 are also provided in the end cover for the purpose of clamping the end connections against the core in a direction parallel to the longitudinal axis of the rotatable member.

In the modification illustrated in Figs. 4, 9, and 10 instead of employing adjusting-screws for the purpose of clamping the end turns or connections against the cylindrical cover 30 in such a manner as just described I employ wedges 46, which are mounted between the inner surfaces of the end connections and the flange 26 of the collar 25. The flange 26 is inclined at $26^a$ at the same angle as the inner surface of each wedge 46, so as to maintain the outer surface of said wedge parallel to the longitudinal axis of the rotatable member in all positions of the wedge. These wedges are held in position, guided by means of keys or splines 47, and are forced inwardly toward the core by means of adjusting-screws 45. It will thus be seen that upon tightening up on the adjusting-screws 45 the wedges 46 are moved so as to force the end connections of the windings outwardly against the cylindrical cover 30. These wedges are so arranged that the end connections of the coils on each pole may be adjusted independently of the end connections of the coils on any other pole. The wedges 46 may, if desired, be provided with openings or cut-away portions 48 in such a manner as illustrated in Fig. 4, said openings or cut-away portions registering with the spaces between the end connections and also with the openings 41 through the flange 26 of the collar 25, so as to permit a free circulation of air through the end connections.

I aim in the appended claims to cover all changes and modifications of my invention which do not involve a departure from its spirit and scope and to include not only its application to rotating field-magnets, as herein shown and described, but to rotating armatures and similar constructions.

Having thus described my invention, what I claim as new, and desire to secure by Letters Patent, is—

1. In a dynamo-electric machine, a rotatable element comprising a core having two or more poles, windings thereon having end turns or connections, and means for supporting said end turns or connections, the supporting means for the end turns on one pole being adjustable independently of the supporting means on any other pole.

2. In a dynamo-electric machine, a rotatable element comprising a core having two or more poles, windings thereon having end turns or connections, and means for supporting said end turns or connections, the supporting means for the end turns of the windings on different poles being independently adjustable.

3. In a dynamo-electric machine, a rotatable element, comprising a core having two or more poles, windings thereon having end turns or connections, and means for supporting said end turns, comprising an outside cylindrical cover, and clamping means for forcing said end turns outwardly against said cylindrical cover, the clamping means for the end turns of the windings on different poles being independently adjustable.

4. In a dynamo-electric machine, a rotatable element comprising a core, windings thereon having end turns or connections, and means for supporting said end turns, comprising an outside cylindrical cover, a collar mounted on the shaft of the rotatable member, and independently-adjustable clamping means mounted on said collar for forcing the end turns outwardly against said cylindrical cover.

5. In a dynamo-electric machine, a rotatable member comprising a core, windings thereon having end turns or connections, and means for supporting said end turns, comprising an outside cylindrical cover, a collar mounted on the shaft of the rotatable member, an annular end cover mounted on said collar, and independently-adjustable means carried by said end cover for clamping the end turns or connections against the core in a direction parallel to the longitudinal axis of the rotatable member.

6. In a dynamo-electric machine, a rotatable element comprising a core, windings thereon having end turns or connections, and means for supporting said end turns, comprising an outside cylindrical cover, a collar mounted on the shaft of the rotatable member, independently-adjustable clamping means carried by said collar for forcing said end connections outwardly against said cylindrical cover, and an annular end cover connecting said collar and said cylindrical cover.

7. In a dynamo-electric machine, a rotatable element comprising a core having two or more poles, a plurality of coils on each pole having end turns or connections, and means for supporting said end turns, comprising an outside cylindrical cover and adjustable clamping means acting upon the end turns of each coil independently to force said end turns outwardly against said cylindrical cover.

8. In a dynamo-electric machine, a rotatable element comprising a core having two or more poles, a plurality of coils on each pole having end turns or connections, and means for supporting said end turns, comprising an outside cylindrical cover, independent adjustable clamping means for each end turn of the coils on each pole for forcing said end turns against said cylindrical cover, said clamping means comprising segments coacting with said end turns and independently-adjustable screws bearing against said segments.

9. In a dynamo-electric machine, a rotatable element, comprising a core having two or more poles, a plurality of coils surrounding each pole, said coils having end turns or connections, and means for supporting said end turns, comprising an outside cylindrical cover, a collar mounted on the shaft of the rotatable member, and independent means carried by said collar for forcing each of the end turns of the coils on a single pole outwardly against the said cylindrical cover.

10. In a dynamo-electric machine, a rotatable element, comprising a core having two or more poles, windings thereon having end turns or connections, and means for supporting said end turns comprising an outside cylindrical cover, a collar mounted on the shaft of the rotatable member having an annular flange, means for holding said collar in position on the shaft, and means mounted on said flange for forcing the end connections outwardly against the cylindrical cover to clamp said end connections in position.

11. In a dynamo-electric machine, a rotatable element comprising a core having two or more poles, a plurality of coils on each pole having end turns or connections, and means for supporting said end turns, comprising an outside cylindrical cover, a collar mounted on the shaft of the rotatable member having an annular flange, means for holding said collar in position on the shaft, and means mounted on said flange for forcing the end connections outwardly against the cylindrical cover to clamp said end connections in position, said clamping means comprising independently-adjustable screws bearing against the separate end connections of the coils on each pole so as to make said end connections on each pole independently adjustable.

12. In a dynamo-electric machine, a rotatable element, comprising a core having two or more poles, windings thereon having end turns or connections, and independently-adjustable means for clamping the end turns of the windings on each pole against the core in a direction parallel to the longitudinal axis of the rotatable member.

13. In a dynamo-electric machine, a rotatable element, comprising a core, windings thereon having end turns or connections, an end cover for said end turns, and independently-adjustable means carried by said cover for clamping said end connections against the core in a direction parallel to the longitudinal axis of the rotatable member.

14. In a dynamo-electric machine, a rotatable member, comprising a core having two or more poles, windings thereon having end turns or connections, an end cover for said end turns, and means carried by said end cover for forcing the end turns of the windings on each pole independently against the core in a direction parallel to the longitudinal axis of the rotatable member.

15. In a dynamo-electric machine, a rotatable member comprising a core, windings thereon having end turns or connections, an end cover and cylindrical cover for said end connections, said end cover and cylindrical cover having interlocking flanges which prevent the cylindrical cover from being thrown out of balance when the latter is subjected to centrifugal forces.

16. As an article of manufacture, a separator for end connections of windings on the rotatable member of a dynamo-electric machine comprising a curved strip having a predetermined radius of curvature and a plurality of spacing-blocks strung on said strip.

17. As an article of manufacture, a separator for end connections of windings on the rotatable member of a dynamo-electric machine comprising a supporting-strip having a plurality of spacing-blocks of insulating material adjustably mounted thereon.

In testimony whereof I affix my signature in the presence of two witnesses.

LOUIS H. DUNKER.

Witnesses:
B. A. BEHREND,
FRED J. KINSEY.